United States Patent Office 2,794,016
Patented May 28, 1957

2,794,016

DENTAL CAVITY PRIMER

John F. Glenn, Milford, Del., and John J. Clancy, Westwood, and Richard S. Brenneman, Natick, Mass., assignors, by direct and mesne assignments, to The L. D. Caulk Company, Milford, Del., a corporation of Delaware No Drawing. Application March 26, 1954,
Serial No. 419,112

8 Claims. (Cl. 260—80.5)

This invention relates to a dental cavity primer, and more particularly, to an anhydrous cavity primer suitable for use with resinous dental filling materials known to the art.

The latter are generally prepared from a monomer component consisting essentially of methyl methacrylate or other ester of methacrylic acid, and a solid polymer component, such as polymethyl methacrylate, the latter being in powdered or finely divided form. These two components are mixed by the dentist in proper proportions and by well known procedures, the mixture placed in the tooth activity, and allowed to set or polymerize to form a hard filling. Usually the polymer component contains pigments to color the mass and a small amount of polymerizing catalyst such as an organic peroxide, more specifically, benzoyl peroxide.

Heretofore there has been some difficulty in obtaining a sufficient adaptation of resin filling materials of methacrylate type to a cavity surface. This inability to adapt to such surfaces has been one of the inherent deficiencies common to all known types of resin filling materials.

Faulty adaptation of such materials to cavity surfaces became noticeable during the old bulk technique of filling and was evidenced by loose fillings and leaking margins. The later introduction of the brush technique of placement of resin fillings somewhat improved this situation. However, even this brush technique has not remedied entirely the poor adaptation of the resin to the tooth.

It is important to appreciate that tight adaptation (i. e., strong adherence of resin filling material to the tooth cavity) is essential to produce an immediate and lasting cavity seal. That is, there should be full adaptation to the form of the cavity in such manner as to eliminate leakage or percolation due to temperature changes. By the latter term is meant porosity between filling and tooth cavity induced by a difference in the coefficient of expansion of the tooth and filling material, respectively. If adaptation is sufficiently obtained, such is avoided.

The chief reason for lack of positive adaptation between the resin filling material and the tooth lies in the difference in chemical composition of the two materials. The tooth is hydrophilic. It is a combination of inorganic salts and organic proteins, both of which are highly hydrated. Tooth surfaces, because of this chemical make-up, are wet readily with water or aqueous solutions. The tooth surfaces are not wet by non-water-miscible organics. The resin filling materials are water-insoluble organophilic compounds. They are not wet readily by water nor will they wet hydrophilic surfaces.

In order to obtain positive detailed adaptation of an organophilic resin to a hydrophilic surface such as dentine and enamel of the tooth, it is necessary to change the surface character of one or the other of these materials. We have considered it to be most feasible to cause this change in the cavity surface of the tooth.

Accordingly, it is a primary purpose of this invention to provide a material which unites with the tooth surface and causes that surface to so change that the organophilic resin is more readily accepted onto the cavity surface. Tight adaptation of the resin to the dentine and enamel of the tooth results.

It is a further object of the invention to provide a cavity primer which enables such an excessively strong bond between tooth cavity and dental filling that even inordinate strains upon the filling are insufficient to destroy its adhesion to the tooth structure.

A further objective of the invention is to produce an anhydrous primer material which effectively scavenges any water present in the cavity. This so-called water scavenging attribute is actually the result of a hydrolysis reaction between any water present and the primer, the effect of which is to produce additional polymerizable material.

It is another object of the invention to provide a cavity primer which effectively increases the natural holding power of the mechanical lock occurring when the filling material, flowing against the cavity surface, fills the irregularities making up the geometry of the cavity. In the instant invention, by treating or conditioning the surface of the dentine or enamel with the primer composition, certain of the substances comprising the tooth structure can be changed organically to make the resin material, or the resin cement if such is used, chemically attractitve to the tooth. This twofold tendency of the cavity primer described herein to penetrate and fill the lattice of the tooth structure while at the same time effecting a chemical union to take place between the resinous material and the conditioned denture and enamel, accomplishes the tightest possible adaptation.

The stated objectives are accomplished by our invention which contemplates a composition containing, in specified proportions, an unsaturated acid such as methacrylic acid, an acid amide such as acrylamide, and a polymerizable solvent material such as liquid methyl methacrylate monomer.

In the use of our composition, the methacrylic acid or the like attacks the inorganic material in the tooth cavity. Although not fully understood, it is believed that this component enters into a characteristic inter-molecular reaction with the phosphate component of the tooth surface in such manner as to more readily adapt to the resin material to the tooth surface. Other substances suitable for use in place of methacrylic acid are acrylic, ethacrylic, and alpha-chloroacrylic acids.

The acrylamide performs a somewhat similar function: that of attacking the protein constituent in the tooth to cause a polymer attachment to the organic structure of the tooth and thus obtain a substantial increase in tensile strength of the bond between tooth cavity and filling. Methacrylamide or methylolacrylamide may be substituted for acrylamide.

The solvent for these components is a polymerizable substance in order that it will not retard but rather enter into the polymerization of other materials placed in the tooth cavity to form the filling. Suitable solvents are the alkyl esters of either acrylic or methacrylic acid having from 1 to about 6 carbon atoms in the alkyl group, such as methyl methacrylate, ethyl methacrylate, isopropyl methacrylate, propyl methacrylate, n-butyl methacrylate, iso-butyl methacrylate, n-amyl methacrylate, n-hexyl methacrylate, cyclo-hexyl methacrylate and the corresponding alkyl esters of acrylic acid.

To the foregoing three essential ingredients an additional component may be added. An anhydride, such as acrylic or methacrylic anhydride, is desirable in the composition as a scavenging agent to eliminate water from the tooth cavity. As stated, by an hydrolysis reaction, water chemically unites with such an anhydride to form additional methacrylic acid, or additional material readily polymerizable with other components of the composition.

It is to be noted that in our primer system, whether it be either the three or four component system described in the foregoing, the primer is bulk polymerized by the action of the filling material being placed in contact with the primer. Such bulk polymerization in place occurs when the primer is contacted with the polymerizing catalyst of the filling material. It is to be observed also that the present invention is primarily concerned with polymer phase solubility so that there will be firm attachment of the primer to the resin fillings being placed therein.

The following examples illustrate specific embodiments of the present invention. In each case the components are given in percentages by weight.

*Example I.*—A composition made up of:

| | Percent |
|---|---|
| Methacrylic acid | 33 |
| Methacrylamide | 1 |
| Methyl methacrylate | 66 |

*Example II.*—A composition made up of:

| | Percent |
|---|---|
| Methacrylic acid | 30 |
| Methylol acrylamide | 0.5 |
| Methyl methacrylate | 67.5 |
| Methacrylic anhydride | 2 |

*Example III.*—A composition made up of:

| | Percent |
|---|---|
| Ethacrylic acid | 40 |
| Methacrylamide | 1 |
| Ethyl methacrylate | 59 |

*Example IV.*—A composition made up of:

| | Percent |
|---|---|
| α Chloroacrylic acid | 20 |
| Acrylamide | 0.5 |
| Cyclohexyl methacrylate | 77.5 |
| Methacrylic anhydride | 2 |

*Example V.*—A composition made up of:

| | Percent |
|---|---|
| Methacrylic acid | 50 |
| Acrylamide | 1 |
| Isobutyl methacrylate | 49 |

*Example VI.*—A composition made up of:

| | Percent |
|---|---|
| Methacrylic acid | 30 |
| Acrylamide | 1 |
| Acrylic anhydride | 1 |
| Methyl methacrylate | 68 |

*Example VII.*—A composition made up of:

| | Percent |
|---|---|
| Acrylic acid | 20 |
| Acrylamide | 1 |
| Methyl methacrylate | 79 |

*Example VIII.*—A composition made up of:

| | Percent |
|---|---|
| Methacrylic acid | 30 |
| Acrylamide | 1 |
| Ethyl acrylate | 69 |

*Example IX.*—A composition made up of:

| | Percent |
|---|---|
| Methacrylic acid | 33 |
| Acrylamide | 1 |
| Methacrylic anhydride | 2 |
| Methyl methacrylate | 64 |

The components identified in the foregoing should be employed in the following proportions, the quantities of each being expressed in percentages by weight:

| | |
|---|---|
| Acrylic, methacrylic, ethacrylic or/α chloroacrylic acid | 5–50%. |
| Acrylamide, methacrylamide, methylol acrylamide | 0.1–2.0%. |
| Acrylic or methacrylic anhydride | 0–5%. |
| Methacrylate or acrylate solvent | In sufficient amount to dissolve the other constituents. |

Experiments have demonstrated that the dental primer comprising this invention obtains a bond between filling and tooth cavity which exceeds by far, in actual tensile strength, the bond which is attained merely by flow of the filling material against the irregularities of the cavity without primer treatment.

The great strength of such a bond has been experimentally proven. Tests were conducted on extracted teeth by preparing a known undercut cavity in the occlusal surface. After preparation, the cavity was treated with the primer of the instant invention. The cavity was then filled with a resin filling material using the brush technique. During the filling procedure a small hook was inserted into the resin, and the completed resin filling was surfaced in normal fashion to remove the excess about the cavity. Fillings were also made without using the primer. In each case the teeth so filled were then stored in water at body temperature for seven days, after which they were subjected to certain tensile strength tests to determine the load required to pull the filling out of the cavity.

These consisted of subjecting such fillings to increasing loads up to approximately 500 p. s. i. Results were then tabulated of the percentage of failures of the fillings at less than 300 p. s. i., the percentage failing between 300 to 500 p. s. i., and the percentage of failures at loads in excess of 500 p. s. i.

These results conclusively showed that a filling which was placed in the cavity without preliminary or primer treatment failed in approximately 52% of the cases subject to stresses of less than 300 p. s. i. In contrast, a filling inserted after treatment of the cavity with the three component composition of the instant invention failed in approximately only 13% of the runs made where loads of 300 p. s. i. or less were imposed, and in over 57% of such runs such fillings did not fail until subjected to at least 500 p. s. i.

A further striking and unusual bonding strength was found to reside in the four component composition of the instant invention (that including the anhydride) where these tensile strength tests indicated that only 2% of the fillings were fractured or removed from the cavity upon the application of 300 p. s. i. or less, and that 79% of them did not fail until at least 500 p. s. i. were applied.

In summary, the series of comparative experiments on fillings made without pretreatment of the tooth cavity and those made with the cavity primer conclusively demonstrated the superior results obtained by use of the composition comprising this invention.

As stated, the primer is designed for use with known filling materials of the methacrylate type. The manner of application can involve either the brush-on technique or the conventional technique. The primer should be applied to the tooth cavity with a cotton pledget just before the dentist places the powder and liquid filling components in the dispensing tray for the brush-on technique or making the mix for the conventional technique.

It is to be understood that the primer is not, strictly speaking, a "cavity liner." After being applied to the dentine and enamel, it stays wet (but not flooded), awaiting contact with the resinous filling material. In contrast to procedures employed with the so-called "dental liners," the primer should not be dried with air or removed from the margin.

The procedure outlined of placing the cavity primer upon the cavity surface prior to filling assures the tightest possible adaptation. It is also extremely useful for securely holding a restoration with a cement of a type similar to the filling material briefly described in the foregoing.

It is to be understood that different embodiments of this invention may be made without departing from the spirit and scope thereof, the invention being limited only as defined in the appended claims.

What we claim is:

1. An anhydrous dental primer composition for use in filling teeth with methacrylate type dental fillers, consisting essentially of a substantially anhydrous, unpolymerized solution of from about 5% to about 50% by weight of an alpha-beta unsaturated acid selected from the group consisting of acrylic, methacrylic, ethacrylic and alpha-chloro acrylic acids, from about 0.1% to about 2% by weight of an alpha-beta unsaturated acid amide selected from the group consisting of acrylamide, methacrylamide, and methylolacrylamide, and a polymerizable liquid monomer solvent selected from the group consisting of the alkyl esters of acrylic and methacrylic acids in which the alkyl group contains from 1 to about 6 carbon atoms, said solvent being in sufficient amount to dissolve said acid and amide.

2. An anhydrous dental primer composition for use in filling teeth with methacrylate type dental fillers, consisting essentially of a substantially anhydrous, unpolymerized solution from about 5% to about 50% by weight of methacrylic acid, from about 0.1% to about 2% by weight of an alpha-beta unsaturated acid amide selected from the group consisting of acrylamide, methacrylamide and methylolacrylamide, and a polymerizable liquid monomer solvent selected from the group consisting of the alkyl esters of acrylic and methacrylic acids in which the alkyl group contains from 1 to about 6 carbon atoms, said solvent being in sufficient amount to dissolve said acid and amide.

3. An anhydrous dental primer composition for use in filling teeth with methacrylate type dental fillers, consisting essentially of a substantially anhydrous, unpolymerized solution of from about 30% to 50% by weight of methacrylic acid, from about 0.5% to about 1% by weight of acrylamide, and a polymerizable liquid monomer solvent selected from the group consisting of the alkyl esters of acrylic and methacrylic acids in which the alkyl group contains from 1 to about 6 carbon atoms, said solvent being in sufficient amount to dissolve said acid and amide.

4. An anhydrous dental primer composition for use in filling teeth with methacrylate type dental fillers, consisting essentially of a substantially anhydrous, unpolymerized solution of from about 30% to about 50% by weight of methacrylic acid, from about 0.5% to about 1% by weight of acrylamide and a sufficient amount of methyl methacrylate solvent to dissolve said acid and amide.

5. An anhydrous dental primer composition for use in filling teeth with methacrylate type dental fillers, consisting essentially of a substantially anhydrous, unpolymerized solution of from about 5% to about 50% by weight of an alpha-beta unsaturated acid selected from the group consisting of acrylic, methacrylic, ethacrylic and alpha-chloro acrylic acids, from about 0.1% to about 2% by weight of an alpha-beta unsaturated acid amide selected from the group consisting of acrylamide, methacrylamide and methylolacrylamide, from about 1% to about 5% by weight of an anhydride selected from the group consisting of acrylic anhydride and methacrylic anhydride, and a polymerizable liquid monomer solvent selected from the group consisting of the alkyl esters of acrylic and methacrylic acids in which the alkyl group contains from 1 to about 6 carbon atoms, said solvent being in sufficient amount to dissolve said acid, amide and anhydride.

6. An anhydrous dental primer composition for use in filling teeth with methacrylate type dental fillers, consisting essentially of a substantially anhydrous, unpolymerized solution of from about 5% to about 50% by weight of methacrylic acid, from about 0.1% to about 2% by weight of acrylamide, about 2% by weight of an anhydride selected from the group consisting of acrylic anhydride and methacrylic anhydride, and a polymerizable liquid monomer solvent selected from the group consisting of the alkyl esters of acrylic and methacrylic acids in which the alkyl group contains from 1 to about 6 carbon atoms, said solvent being in sufficient amount to dissolve said acid, amide and anhydride.

7. An anhydrous dental primer composition for use in filling teeth with methacrylate type dental fillers, consisting essentially of a substantially anhydrous, unpolymerized solution of from about 30% to about 50% by weight of methacrylic acid, from about 0.5% to about 1% by weight of acrylamide, about 2% by weight of methacrylic anhydride, and a polymerizable liquid solvent selected from the group consisting of the alkyl esters of acrylic and methacrylic acids in which the alkyl group contains from 1 to about 6 carbon atoms, said solvent being in sufficient amount to dissolve said acid, amide and anhydride.

8. An anhydrous dental primer composition for use in filling teeth with methacrylate type dental fillers, consisting essentially of a substantially anhydrous, unpolymerized solution of from about 30% to about 50% by weight of methacrylic acid, from about 0.5% to about 1% by weight of acrylamide, about 2% by weight of methacrylic anhydride, and a sufficient amount of methyl methacrylate solvent to dissolve said acid, amide and anhydride.

References Cited in the file of this patent
UNITED STATES PATENTS
2,653,140    Allenby et al. _____ Sept. 22, 1953